US006881361B1

(12) United States Patent
Schulze et al.

(10) Patent No.: US 6,881,361 B1
(45) Date of Patent: Apr. 19, 2005

(54) METHOD FOR PRODUCING SHAPED BODIES

(75) Inventors: Thomas Schulze, Jena (DE); Eberhard Taeger, Weissbach (DE); Dieter Vorbach, Rudolstadt (DE)

(73) Assignee: Ostthuringische Materialprufgesellschaft fur Textil und Kunststoffe mbH, Rudolstadt-Schwarza (DE)

( * ) Notice: Subject to any disclaimer, the term of this patent is extended or adjusted under 35 U.S.C. 154(b) by 0 days.

(21) Appl. No.: 09/936,086

(22) PCT Filed: Feb. 24, 2000

(86) PCT No.: PCT/DE00/00552

§ 371 (c)(1),
(2), (4) Date: Feb. 8, 2002

(87) PCT Pub. No.: WO00/53833

PCT Pub. Date: Sep. 14, 2000

(30) Foreign Application Priority Data

Mar. 8, 1999 (DE) .......................................... 199 10 012

(51) Int. Cl.⁷ ........................ B29C 47/06; C01B 31/02; D01D 5/24; D01D 5/34; D01F 9/16
(52) U.S. Cl. .................... 264/29.1; 264/29.2; 264/29.6; 264/29.7; 264/171.26; 264/171.27; 264/172.15; 264/173.11; 264/185; 264/186; 264/187; 264/203; 264/211; 264/561; 264/562

(58) Field of Search ................................ 264/563, 29.1, 264/29.2, 29.6, 29.7, 171.26, 171.27, 172.15, 173.11, 185, 186, 187, 203, 211, 561, 562

(56) References Cited

PUBLICATIONS

Vorbach, D., & Taeger, E., "Properties of carbon filled cellulose filaments." Chemical Fibers International. vol. 48, pp. 120–122, Apr. 1998.

*Primary Examiner*—Leo B. Tentoni
(74) *Attorney, Agent, or Firm*—Marianne Fuierer; Steven J. Hultguist

(57) ABSTRACT

The invention relates to a method for producing shaped bodies, especially threads or foils, from at least one polymer of the groups consisting of polysaccharide, polysaccharide derivative or polyvinyl alcohol by forming a solution of the polymer that contains an additive in a solvent containing amine-N-oxide, extruding the solution and precipitating the extrudate by contacting with a coagulant. The invention is characterized in that at least two polymeric solutions are formed. At least one of the two polymeric solutions contains one or more finely distributed additives and the at least two polymeric solutions are simultaneously extruded forming a combined extrudate.

14 Claims, 1 Drawing Sheet

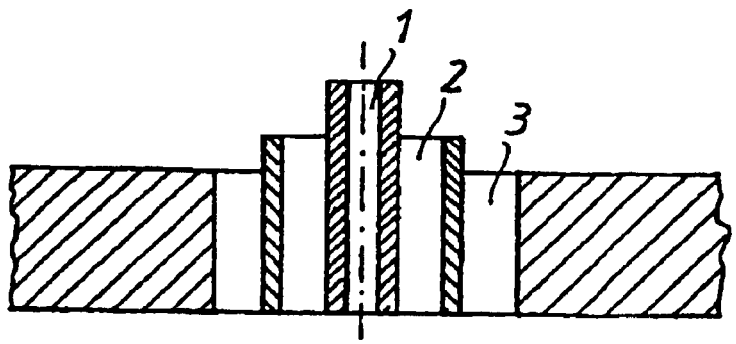
FIGURE 1
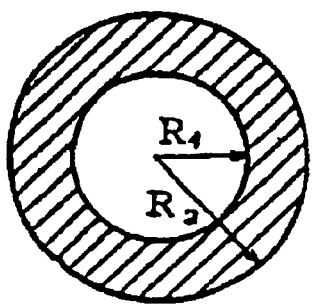 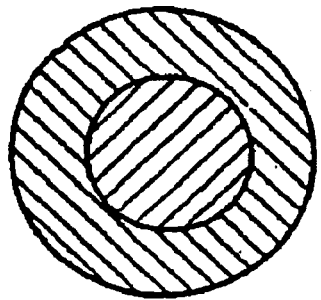
FIGURE 2A          FIGURE 2B
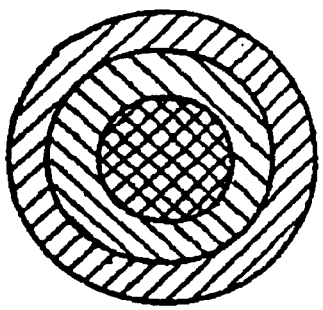 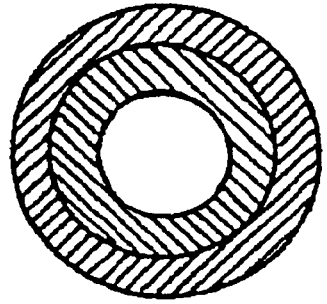
FIGURE 2C          FIGURE 2D

METHOD FOR PRODUCING SHAPED BODIES

CROSS-REFERENCE TO RELATED APPLICATIONS

This application is filed under the provisions of 35 U.S.C. §371 and claims the priority of International Patent Application No. PCT/DE00/00552 filed Feb. 24, 2000, which in turn claims priority of German Patent Application No. 199 10 012.8 filed on Mar. 8, 1999.

The invention relates to a procedure for the manufacture of molded parts, such as threads or films, out of at least one polymer from the group comprised of polysaccharide, polysaccharide derivative and polyvinyl alcohol by forming a solution of the polymer in a solvent containing amine-N-oxide, extruding the solution and precipitating the extrudate by bringing it into contact with a coagulation bath. In particular, the invention relates to a procedure for manufacturing multi-layer, massive or hollow filaments, fibers or films.

FIELD OF THE INVENTION

It is known that powdery and liquid additives can induce targeted changes in the properties of polymers. Admixing function-imparting substances to polymer melts or solutions yields numerous special polymeric substances. In this case, it must be remembered that powdery or liquid additives can influence the flow behavior of polymer melts or solutions in such a way as to create significant problems in the manufacturing process. The suitability of a potential additive as a function-imparting agent is also determined by is solubility and reactivity relative to the polymers, solvents and aids used in the manufacturing process, as well as to the temperature and processing/preparation conditions during the manufacture of the solution and subsequent treatment of the products. Another problem when processing several polymers or polymer solutions at once involves adjusting pure with modified polymer phases, or of several differently modified polymer phases.

BACKGROUND OF THE INVENTION

In conventional polymer wet spinning procedures, these problems always become evident when large quantities of additives are admixed in a finely dispersed manner, and the obtained solutions are to be processed via spinning. In particular, highly acidic and alkaline working conditions of the kind necessary for dissolving and regenerating the cellulose greatly limit the number of possible additives. In addition, it is known that larger quantities of additives can result in a loss of spinability, e.g., due to viscosity changes in both melt spinning processes and conventional wet spinning procedures.

While these disadvantages are circumvented by using the Lyocell procedure (DE 44 26 966 A1), the procedure in the described form does not enable the manufacture of multiple-layer, functional threads.

SUMMARY OF THE INVENTION

The object of the invention is to create a procedure which can be used to manufacture massive or hollow multi-component molded parts, e.g., fibers, filaments and films, with greatly varying charges of identical or different additives. In particular, a procedure for manufacturing molded parts with symmetrical core jacket structures or asymmetrical structures is to be provided. Preferably to be provided is an extrusion procedure for manufacturing multi-component molded parts, which have a variety of uses, and in particular yield materials with special properties and use properties. Other advantages stem from the following description.

This object is achieved in the procedure mentioned at the outset according to the invention by generating at least two polymer solutions, of which at least one contains one or more solid or liquid, finely dispersed additives, and by simultaneously extruding the at least-two polymer solutions accompanied by the formation of a combined extrudate. It was surprisingly found that an extrudate forms according to the invention in which two or more polymer solutions are mutually integrated and combined in such a way that no separation of the layers formed by the various polymer solutions takes place either during precipitation or subsequent drying and possible thermal treatment. This also holds true when the additives in the polymer solutions vary greatly in terms of their particle size, material composition and content. Depending on the used additives, the molded part present after precipitation can have the most varied of uses. The procedure can start out from various polymer solutions, e.g., two polymer solutions, of which only on has a solid or liquid additive, two polymer solutions, which both contain solid or liquid additives, three polymer solutions, whose additives differ by type, particle size and/or content, etc. The used solutions can contain 1 to 20% w/w, preferably 4 to 16% w/w, of the polymer. In particular polyols, such as cellulose, starch or polyvinyl alcohol, and their derivatives, can be used as the polymers. The additives are added 1) either at the outset of solution manufacture to the polymer-solvent-water mixture, 2) after prior complete dissolution of the polymers, or 3) into the polymer-solvent mixture, and finely dispersed therein through vigorous mixing or kneading. In all cases, the polymers dissolve during the evaporation of a production-related excess of water under a vacuum at elevated temperatures. The massive or hollow multi-component molded parts manufactured according to the invention can have special functional properties owing to the incorporated additives, e.g., electronic or ionic conductivity, as well as magnetic or catalytic activity.

According to the preferred embodiment of the procedure, the at least two polymer solutions are distinguished by the particle size and/or the material composition and/or the content of additives. The procedure provides a way to control the thickness and function of the layers by loading the polymer solution(s) with additive. Loading the polymer solution(s) to varying levels results in different shrinkages, and hence to adjustable layer thicknesses; different additives in the polymer solutions can impart various functions to the molded parts.

The solid additives are preferably set with a particle size ranging from 0.01 to 1000 $\mu$m, in particular from 0.05 to 100 $\mu$m. The additives can be inorganic or organic, or mixtures of both substances.

In the preferred embodiment of the procedure according to the invention, use is made of additives from the group consisting of oxides, carbides, borides, nitrides, oxynitrides, siolones and aluminosilicates. In addition, use can be made of carbon-containing materials, metal powders, metal salts, polymer fibers, particle suspensions, ceramic-forming low or high-molecular compounds, sinterable inorganic compounds, lead zirconium titanates or mica in a finely dispersed suspension.

In the procedure according to the invention, use can be made of polymer solutions with a weight ratio of polymer to additive of 10:1 to 1:100. The share of polymer to additive preferably ranges from 1:1 to 1:7. The weight ratio of polymer to additive often ranges from 9:1 to 1:10.

The polymer solution is preferably extruded at varying volumetric rates (e.g., by setting the displacement of the conveyor pumps). In this way, the layer formation on the molded parts can be controlled in such a way that both thick, preferably 100 to 200 μm thick layers and thin, 0.1 to 20 μm thick layers can be formed. If only a polymer solution loaded slightly with additives (weight ratio of additive to polymer= 0.5 to 2.0) is extruded together with a higher loaded solution (weight ratio of additive to polymer=5 to 8) in roughly the sane volume shares per unit of time, a thin cover layer on a thicker hollow structure results after preparation and drying, which is important for the manufacture of ceramic hollow membranes or carriers of functional components.

Two or more polymer solutions are preferably extruded concentrically, and coagulated to form massive fibers consisting of two or more components from outside. In this case, solutions from various solution reservoirs are deformed via profiled round or flat nozzle structures without an additional device for feeding liquid or gas inside the extrudate.

In another embodiment, two more polymer solutions are centrically extruded, and, to form massive multi-component threads, a highly enriched additive dispersion is centrally supplied and the polymer solutions are also coagulated from outside. In this case, the device is set up for a separate supply of liquid, so that an immediate intimate bond is ensured for the polymer solutions as they exit the nozzle openings. The use of a highly enriched additive particle dispersion inside the molded part makes it possible to obtain three-component fibers or filaments with a filled core.

In another embodiment of the procedure according to the invention, the volumetric ratio between the two or more concentrically extruded polymer solutions and a centrally supplied coagulant or gas is selected in such a way as to expand the polymer solution tube or composite tube. Setting the quantity of centrally supplied coagulant, space-filling liquid or gas yields the desired level of expansion. The liquid polymer solutions are already pre-stabilized on the inside by contact with the coagulant. The hollow filaments manufactured in this way can have a diameter ranging from 0.1 to 5 mm in a freshly spun state. Coagulation can take place with air, water, organic solvents or particle dispersions. The use of such solvents for hollow-space formation, which do not instantly result in the coagulation of cellulose, makes it possible to fabricate hollow filaments with low diameters (compare Example 10). If internal coagulation by adding space-filling liquids is not performed, the liquid spinning jets underneath the nozzle can combine immediately without the formation of continuous or blistered hollow spaces, and hence form a massive core-jacket structure. Two or more solutions are best extruded concentrically and coagulated to form bi- or multi-component hollow threads from inside and outside, or only from outside. The hollow threads are characterized by inner radius $R_1$ and outer radius $R_2$. The invention extends to hollow threads in a range of $0<R_1<R_2$, i.e., also encompasses massive threads without a hollow space. The extrudate can be stretched in an air gap before precipitation to set the dimensions of the core and jacket layer(s). In this case, the extruded solutions can be passed over an air gap preferably 1 to 500 mm wide, wherein the high spinning safety either produces a delay owing to the force of gravity of the free-falling polymer solution, or stretches the still liquid solution jet as the result of a specific delay. It can also be directly introduced into the precipitation bath for immediate coagulation. The polymer solutions deformed in this way can be introduced into a coagulation bath containing a precipitant, preferably water, for purposes of final stabilization via the instantaneous precipitation of the polymer on the outer layer of the thread before the solvent that still adheres primarily on the inside is removed through continuous or batch-wise treatment with cold or warm water, being replaced entirely by water while retaining the swelling state, and completely precipitating out the carrier polymer matrix.

In the preferred embodiment of the procedure according to the invention, the coagulated extrudate is dried and passed on to a specific application, or its polymer content is removed via thermal treatment. Through the elimination of the polymer matrix, this thermal treatment yields special materials based on the selected additives, e.g., inorganic, porous, multi-layer hollow membranes, multi-layer membrane reactors, ceramic-matrix composites, conductive multi-component fibers, catalyst carriers and ionic conductors. It was discovered that the multi-layer molded part withstands thermal treatment without impairment, in particular without the layers detaching, separating or developing cracks, even though very different additives are used or great charging differences exist between the polymer layers of the molded part. The procedure according to the invention also makes it possible to set the size and density of the pores in the thermally treated body through the selection of additives. In porous hollow membranes, the porosity and pore size of the layers can be controlled by the parameters of the extrusion procedure or properties of the polymer solutions. Thermal treatment over the stability limit of the polymer, preferably that of the cellulose, makes it possible to convert the multi-component extrudates into purely inorganic, porous or microcrystalline, dense structures. The thermal treatment can also be conducted in such a way that the polymer content is only converted into carbon.

The thermal treatment is preferably conducted at a temperature ranging from 250 to 3500° C. in the presence of oxygen, inert gas or under a vacuum. In this case, the complete or partial pyrolysis/combustion of the matrix polymer yields a purely ceramic, metallic or carbon-containing fiber or a composite with carbon layers.

Thermal treatment best takes place in a first stage at a lower temperature, and in a second stage at a higher temperature, and oxidating conditions prevail in only one of the two stages.

The monohydrate of N-methylmorpholine-N-oxide is preferably used as the solvent for the polymers. Cellulose is preferably used as the polymer, even though other polyols or polysaccharides can be used separately or in mixture. It has been discovered that solid adhesion between the layers in the precipitated or dried or thermally treated extrudate is achieved even given a very different particle size and/or charging of the polymer solutions with additive and/or pronounced chemical differences in the additives.

BRIEF DESCRIPTION OF THE FIGURES

FIG. 1 shows the diagrammatic axial section of a three-component circular nozzle for the procedure according to the invention, with a central cylindrical channel and two annular channels 2, 3.

FIGS. 2A, B, C, and D shows four different fiber cross-sections, which can be manufactured using the procedure according to the invention.

To further illustrate the procedure according to the invention, the manufacture of different multi-layer structures will be explained based on the following examples.

DETAILED DESCRIPTION OF THE INVENTION

EXAMPLE 1

Aluminum oxide with an average particle size of 0.7 μm is added to a 7.5% w/w polysaccharide solution (8 parts cellulose, 2 parts amylose) in N-oxide-N-oxide monohydrate in a percentage by weight of 500% w/w relative to the cellulose share. In like manner, a solution is prepared having aluminum oxide with an average particle size of 3.6 µm in the same proportions. Both solutions are extruded at a temperature of approx. 100° C. through a double-slit hollow core nozzle in a ratio of 1:1, wherein the same volumetric percentage of water is pumped through the inside of the nozzle to achieve hollow structures. The nozzle was situated a distance of 10 cm away from the aqueous precipitation bath. The bi-component hollow filaments spun in this way without any additional pull-off were repeatedly extracted with warm water and then dried at room temperature under a constant load. The resulting materials had a outside diameter of approx. 1 mm. Drying was followed by sintering at 1500° C. The layers that formed in the process exhibited pore sizes of 950 and 150 nm. (FIG. 2D).

EXAMPLE 2

Aluminum oxide with an average particle size of 0.7 µm is added to a 7.5% w/w cellulose solution in N-oxide-N-oxide monohydrate in a percentage by weight of 250% w/w relative to the cellulose share. In like manner, a solution is prepared having an aluminum oxide with an average particle size of 1.2 µm relative to the cellulose share of 500% w/w. Both solutions are co-extruded at a temperature of approx. 90° C. at a ratio of core to jacket of 3:1, and relayed to a water bath vertically over a 15 cm long air gap. During extrusion, a quantity of water corresponding to the volume flux of both pumps is pumped inside the nozzle. The raw filaments spun in this way are stripped of solvent through repeated extraction with warm water, and dried at room temperature for several hours. After sintering at 1450° C., pore sizes of 450 or 200 nm result for the core and jacket layer. (FIG. 2D).

EXAMPLE 3

Aluminum oxide with an average particle size of 0.7 µm is added to a 9% w/w cellulose solution in N-oxide-N-oxide monohydrate in a percentage by weight of 700% w/w relative to the cellulose share. This solution is extruded together with a 9% w/w pure polysaccharide solution (amylose:cellulose=1:1) in N-oxide-N-oxide monchydrate at 105° C. at a ratio of core to jacket of 1:1 through a double-slit nozzle into a monofilament thread, wherein the uncharged solution is passed through the central borehole. The pull-off rate measured 25 m/min. The nozzle was situated a distance of 3 cm away from the aqueous precipitation bath. The exiting thread was passed through a precipitation bath 2 m long and then wound. After the thread is dried at room temperature, sintering takes place at 1450° C., and a hollow structure is formed by complete pyrolysis of the cellulose inside the bi-component filament, wherein the remaining jacket layer exhibits an average pore size of 150 nm. (FIG. 2A).

EXAMPLE 4

A 6.5% w/w solution of 5 parts cellulose and 1 part carboxymethyl starch in N-oxide-N-oxide monohydrate, which is loaded with 600% w/w aluminum oxide with an average particle size of 4.6 µm relative to the cellulose share, is extruded together with an uncharged 12% w/w cellulose solution in a ratio of 1:2, wherein the charged solution is metered through the central supply system, and the distance between the nozzle and precipitation bath measures 15 cm. Water is pumped inside the nozzle to generate a hollow structure.

After extraction with water, drying takes place at room temperature. Sintering takes place under an inert atmosphere at 1900° C. with the formation of a porous carbon layer on a carrying ceramic layer. (FIG. 2D).

EXAMPLE 5

Aluminum oxide with an average particle size of 0.7 µm is added to a 7.5% w/w cellulose solution in N-oxide-N-oxide monohydrate in a percentage of weight of 500% w/w relative to the cellulose share. In like manner, a 7.5% w/w cellulose solution is prepared, which contains silicon carbide with an average particle size of 0.8 µm in a percentage by weight of 500% w/w relative to the cellulose share. Both solutions are extruded at a ratio of core to jacket of 1:1 through a double-slit nozzle into a monofilament thread, wherein the aluminum oxide-containing solution is passed through the central borehole. The pull-off rate measured 20 m/min. The nozzle was situated a distance of 5 cm away from the aqueous precipitation bath. The exiting thread was passed through a precipitation bath 2 m long, wound an dried at room temperature. Microcrystalline fibers with an aluminum core and silicon carbide jacket were obtained after sintering at 1800° C. in air. (FIG. 2B).

EXAMPLE 6

Aluminum oxide with an average particle size of 0.7 µm is added to a 6% w/w solution of cellulose in N-oxide-N-oxide monohydrate in a percentage by weight of 100% w/w relative to the cellulose share and 1% nickel powder. This solution is extruded together with a 7.5% w/w solution of cellulose in N-oxide-N-oxide monohydrate, which is mixed with 500% w/w aluminum oxide with an average particle size of 4.5 µm relative to the cellulose share, at 85° C. through a double-hollow chamber nozzle at a ratio of 3:1, wherein water is pumped inside the nozzle and the distance to the precipitation bath measured 15 cm. Sintering takes place at 1600° C. in an inert atmosphere with subsequent treatment at 500° C. in air. (FIG. 2D).

EXAMPLE 7

A 9% w/w solution of cellulose in N-oxide-N-oxide monohydrate is extruded together with a 7.5% w/w solution of cellulose in N-oxide-N-oxide monohydrate, which contains 100% w/w soot relative to the cellulose share, at 90° C. in a ratio of 1:1 through a double-gap nozzle into a monofilament thread, wherein the pure cellulose solution is supplied through the inner channel. The pull-off rate measured 30 m/min, at a distance between the nozzle and precipitation bath of 2 cm. Passage through an aqueous precipitation bath was followed by winding, extraction with water and drying at room temperature. (FIG. 2B).

EXAMPLE 8

A 6.5% w/w solution of cellulose in N-oxide-N-oxide monohydrate is mixed with 25% w/w melamine and 75% boric acid relative to cellulose. This solution is extruded together with a 9% w/w solution of cellulose in N-oxide-N-oxide monohydrate at 100° C. through a double-slit nozzle, wherein the pure cellulose solution is metered in through the outer slit. The distance to the precipitation bath measured 1 cm, the pull-off rate 12 m/min. Extraction with cold water is followed by drying at room temperature. Thermal treatment took place at 1600° C., and yielded boron nitride threads through pyrolysis of the polymer and conversion of the filler.

EXAMPLE 9

A 7% w/w solution of cellulose in N-oxide-N-oxide monohydrate containing 300% w/w zirconium oxide relative to the cellulose share is extruded together with a 9% solution of cellulose in N-oxide-N-oxide monohydrate charged with 100% w/w nickel powder at 90° C. through a double-slit hollow nozzle, wherein a starch-enriched aqueous metal suspension is pumped through the central supply system, whose composition is set to a ratio of water to starch to metal powder of 30:30:40. In this case, the solution charged with zirconium oxide is passed through the inner slit of the nozzle, while the solution charged with nickel is passed through the outer slit. At a distance between the nozzle and precipitation bath of 1 cm, 3-component threads are obtained, which are subjected to a drying process at room temperature. After pyrolysis of the polymers, pure 3-component fibers are obtained, which exhibit a conductor-insulator-conductor layer sequence. (FIG. 2C).

EXAMPLE 10

A 9% w/w solution of cellulose in N-methylmorpholine-N-oxide monohydrate is mixed with aluminum oxide with an average particle size of 0.7 μm, so that the ratio of cellulose to aluminum oxide measures 1:3. This solution is extruded at 90° C. through a hollow slit nozzle, wherein ethylene glycol is metered in through the inner channel in such a way that sufficient hollow space formation takes place. The spinning jets are routed into a coagulation bath via an air gap of 5 cm, and pulled off at a rate of 60 m/min. After winding, the adhering solution is removed with water and dried. Thermal treatment at 1600° C. yields hollow fibers with a diameter of 150 μm. (FIG. 2A).

EXAMPLE 11

A 12% w/w solution of cellulose in N-oxide-N-oxide monohydrate is extruded together with an 8% w/w solution of cellulose in N-oxide-N-oxide monohydrate mixed in with 700% w/w iron powder relative to the cellulose share at 100° C. at a ratio of 1:1 through a hollow slit nozzle, wherein the pure solution is supplied through the outer slit. At a distance of 1 cm to the aqueous precipitation bath, the pull-off rate measured 50 m/min. After aqueous extraction and drying, iron powder-filled cellulose filaments are obtained, e.g., of the kind that can be used for shielding purposes.

The polymer solutions are extruded and coagulated according to the Lyocell procedure (H. J. Koslowski, Chemiefaserlexikon, 11$^{th}$ Edition (1998), p. 95, and additional literature). The extrusion temperature for the polymer solution ranges from 80 to 120° C., preferably from 85 to 105° C.

What is claimed is:

1. A procedure for the manufacture of molded parts, in particular threads or films, the procedure comprising:

forming at least two separate polymer solutions, wherein a first polymer solution comprises at least one polymer in a solvent containing amino-N-oxide and wherein the at least one polymer is selected from the group consisting of polysaccharide derivative and polyvinyl alcohol; and simultaneously extruding the at least two separate polymer solutions to form a combined extrudate and precipitating the extrudate by bringing it into contact with a coagulant, wherein at least one of the polymer solutions contains at least one inorganic or organic additive selected from the group consisting of oxides, carbides, borides, nitrides, oxynitrides, sialones and aluminosilicates, carbon-containing materials, metal powders, metal salts, polymer fibers, particle suspensions, ceramic-forming low molecular compounds and ceramic-forming high-molecular compounds, the additive having a functional ability selected from the group consisting of catalytically active, electronically conductive, ionically conductive, piezoelectric, insulating, pore-forming, mechanically strengthening, absorbing active and surface active, and wherein the polymer solutions have a weight ratio of polymer to additive of 10:1 to 1:100.

2. The procedure according to claim 1, wherein at least two polymer solutions differ in at least one property selected from the group consisting of particle size, material composition and content of additives.

3. The procedure according to claim 1 wherein the additives have a particle size ranging from 0.01 to 1000 μm.

4. The procedure according to claim 1, wherein the polymer solutions are extruded at different volumetric rates.

5. The procedure according to claim 1, wherein the two or more polymer solutions are concentrically extruded and, to form massive bi- or multi-component threads, coagulated only from outside.

6. The procedure according to claim 1, wherein the two or more polymer solutions are concentrically extruded and, to form massive three-component threads, an additive dispersion is centrally supplied and coagulated from outside.

7. The procedure according to claim 1, wherein the volumetric ratio between the two or more extruded polymer solutions and a centrally supplied space-filling liquid or a gas is selected in such a way as to expand the polymer solution hose.

8. The procedure according to claim 1, wherein the two or more polymer solutions are concentrically extruded and, to form bi- or multi-component threads, coagulated from inside and outside.

9. The procedure according to claim 1, wherein th extrudate is stretched in an air gap before precipitation to set the dimensions of the core and jacket layers.

10. The procedure according to claim 1, wherein the coagulated extrudate is dried, and its polymer content is removed and/or carbonized via thermal treatment.

11. The procedure according to claim 10, wherein the thermal treatment is conducted in a temperature range of 250 to 3500° C. in the presence of oxygen, inert gas or under a vacuum.

12. The procedure according to claim 10, wherein the thermal treatment takes place in a first stage at a lower temperature, and in a second stage at a higher temperature, and that oxidizing conditions prevail only in one of the two stages.

13. The procedure according to claim 1, wherein monohydrate of the N-oxide is used as the solvent.

14. The procedure according to claim 1, wherein cellulose is used as the polymer.

\* \* \* \* \*

UNITED STATES PATENT AND TRADEMARK OFFICE
CERTIFICATE OF CORRECTION

PATENT NO. : 6,881,361 B1
DATED : April 19, 2005
INVENTOR(S) : Schulze, Thomas et al.

It is certified that error appears in the above-identified patent and that said Letters Patent is hereby corrected as shown below:

Column 5,
Line 43, "monchydrate" should be -- monohydrate --

Signed and Sealed this

Second Day of August, 2005

JON W. DUDAS
*Director of the United States Patent and Trademark Office*